M. A. Jones,
Bread Making Mach.

No. 75,922.   Patented Mar. 24, 1868.

Witnesses
W. C. Ashkettle
J. Fraser

Inventor.
M. A. Jones
per Munn &Co
Attorneys

United States Patent Office.

MARCUS A. JONES, OF FRANKFORT, KENTUCKY.

Letters Patent No. 75.922. dated March 24, 1868.

---

IMPROVED BREAD-MAKING MACHINE.

---

*The Schedule referred to in these Letters Patent and making part of the same.*

---

TO ALL WHOM IT MAY CONCERN:

Be it known that I, MARCUS A. JONES, of Frankfort, in the county of Franklin, and State of Kentucky, have invented a new and improved Bread-Making Machine; and I do hereby declare that the following is a full, clear, and exact description thereof, which will enable those skilled in the art to make and use the same, reference being had to the accompanying drawings forming part of this specification, in which—

Similar letters of reference indicate corresponding parts.

Figure 1:
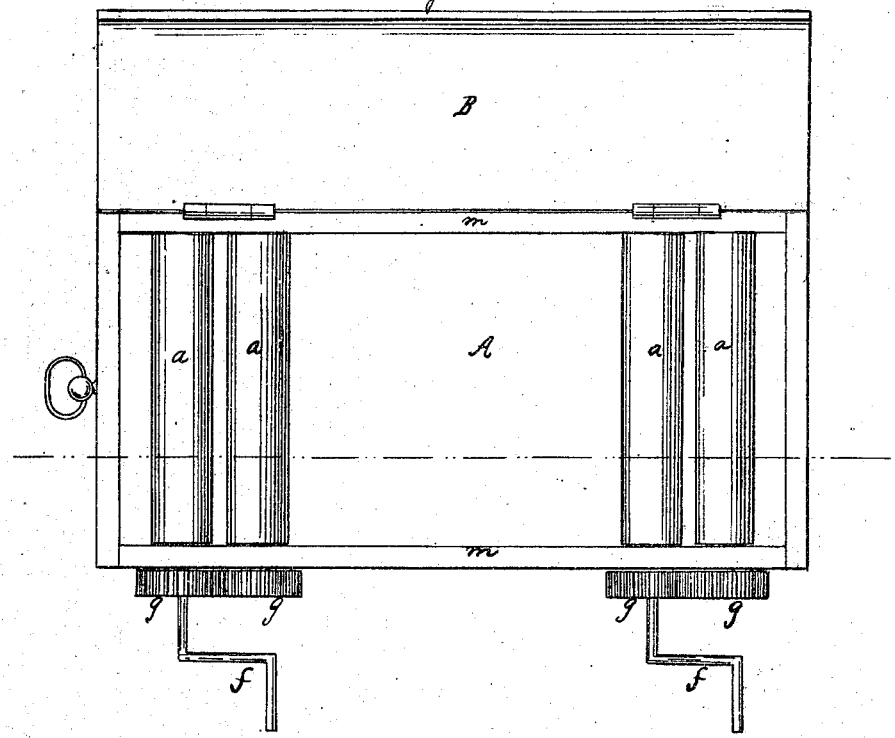
Figure 1 is a top view of the machine with the lid raised.
Figure 2:
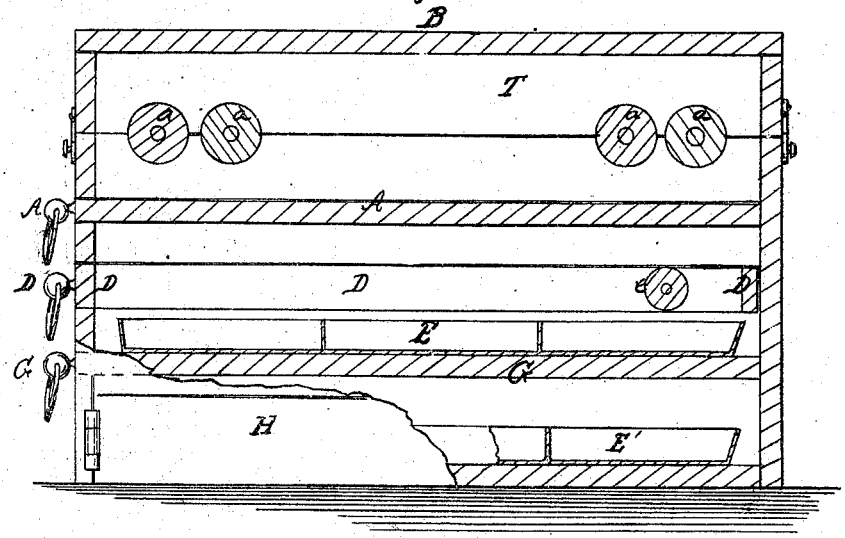
Figure 2 is a vertical section of the machine through the line $x$ $x$, fig. 1.

This invention accomplishes the working, rolling, and cutting out of dough by devices which will now be set forth by reference to the drawings, which show a box or case provided with a hinged lid, B, covering the first compartment.

In this compartment the dough is mixed and kneaded by the rollers $a$ $a$, as shown, the said rollers having cranks $f$ and gear-wheels $g$. One pair of rollers is used to mix and knead the dough, and the other pair for gathering up the mixed dough into a mass. The sliding bottom A slides in grooves in the general sides $m$ of the box. This bottom is withdrawn when the dough is kneaded sufficiently, which permits the same to fall upon the bottom, G, on which rests a sheet-metal pan, E, having partitions for dividing the dough into smaller forms, as biscuit and the like. The dough falls upon the pan, and the withdrawal of the slide-frame D, which contains a roller, $e$, rolls out the mass of dough, and forces it into the several divisions of the pan. The sliding bottom G is for the purpose of holding the pan E up against the lower edge of the roller $e$, and after the dough is rolled into the pan, to drop the latter into the bottom compartment, as shown at E', from whence it is withdrawn through the lateral door H, as shown. The roller-frame D, like the sliding bottoms A and G, slides in grooves in the sides $m$ of the box, and through an opening in the end of the box. The top, T, of the box is removable, and fits upon the necks of the rollers $a$.

The operation is obvious from the above description.

The principal advantages of this invention are as follows: First, the making of bread and preparing it for the oven requires less labor than when made and prepared by hand; second, it is more thoroughly mixed, and in less time than when done by hand; third, it can be operated by persons unskilled in making bread. It is simple, durable, and of small cost, and has been proven by daily practical use to accomplish all that has been above set forth.

I claim as new, and desire to secure by Letters Patent—

The combination of the rollers $a$ $a$, sliding bottoms A and G, and roller-frame D, all substantially as shown and described, and for the purpose set forth.

MARCUS A. JONES.

Witnesses:
LAWRENCE NOLAN,
JOHN S. MARSHALL.